US012062299B2

(12) United States Patent
Zhou et al.

(10) Patent No.: US 12,062,299 B2
(45) Date of Patent: Aug. 13, 2024

(54) METHOD AND SYSTEM FOR MEASURING RELATIONSHIP BETWEEN CRASH DUMMY CHEST COMPRESSION AND SAFETY BELT LOAD

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Hua Zhou, Tianjin (CN); Zhixin Liu, Tianjin (CN); Weidong Liu, Tianjin (CN); Yaodong Xie, Tianjin (CN); Hai Liu, Tianjin (CN); Hanxiao Zhang, Tianjin (CN); Jing Li, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 0 days.

(21) Appl. No.: 18/474,266

(22) Filed: Sep. 26, 2023

(65) Prior Publication Data
US 2024/0185741 A1 Jun. 6, 2024

(30) Foreign Application Priority Data
Dec. 2, 2022 (CN) .......................... 202211532716.7

(51) Int. Cl.
*G09B 23/32* (2006.01)
*G01M 17/007* (2006.01)

(52) U.S. Cl.
CPC ......... *G09B 23/32* (2013.01); *G01M 17/0078* (2013.01)

(58) Field of Classification Search
CPC ........................... G09B 23/32; G01M 17/0078
See application file for complete search history.

(56) References Cited

U.S. PATENT DOCUMENTS 4,409,835 A * 10/1983 Daniel .................. A61B 5/103
434/274
5,317,931 A * 6/1994 Kalami ............. G01M 17/0078
33/760

(Continued)

*Primary Examiner* — Eric S. McCall
*Assistant Examiner* — Timothy P Graves
(74) *Attorney, Agent, or Firm* — True Shepherd LLC; Andrew C. Cheng

(57) ABSTRACT

A method for measuring a relationship between crash dummy chest compression and a safety belt load, includes: controlling, when a dummy is fixed in a preset posture on a fixed bed in a test platform via a safety belt in a safety belt restraint apparatus, a chest cover plate in the test platform to move so as to maintain a preset relative position between the chest cover plate and the dummy; controlling an impact apparatus to pull the safety belt in each pulling force to be measured, and determining a target displacement value of each measuring point on the dummy and a target pulling force between the impact apparatus and the safety belt after a first preset duration; and determining a target pulling force-displacement curve corresponding to each measuring point according to each target displacement value and each target pulling force.

10 Claims, 19 Drawing Sheets

(56) References Cited

U.S. PATENT DOCUMENTS

| | | |
|---|---|---|
| 5,533,756 A | 7/1996 | Dybro et al. |
| 7,284,769 B2 | 10/2007 | Breed |
| 7,635,043 B2 | 12/2009 | Breed |
| 2009/0056475 A1* | 3/2009 | Grabowski ............. B60R 22/00 |
| | | 73/862.391 |
| 2013/0233050 A1* | 9/2013 | Kral .................... G01M 99/007 |
| | | 73/12.13 |

* cited by examiner

A

US 12,062,299 B2

METHOD AND SYSTEM FOR MEASURING RELATIONSHIP BETWEEN CRASH DUMMY CHEST COMPRESSION AND SAFETY BELT LOAD

CROSS-REFERENCE TO RELATED APPLICATIONS

This application claims priority to Chinese Patent Application No. 202211532716.7 with a filing date of Dec. 2, 2022. The content of the aforementioned application, including any intervening amendments thereto, is incorporated herein by reference.

TECHNICAL FIELD

The present disclosure relates to the field of simulation tests, in particular to a method and system for measuring a relationship between crash dummy chest compression and a safety belt load.

DESCRIPTION OF RELATED ART

At present, a human chest is often injured in traffic accidents. Although a safety belt of a vehicle can ensure human safety to a certain extent, a restraining force exerted by the safety belt can also cause certain damage to the human chest.

Therefore, performance of safety belts needs to be evaluated during production. The performance of safety belts of vehicles is mainly tested through a dummy (for example, a vehicle crash dummy) instead of a real object. However, if a chest of the crash dummy and a chest of the real object are greatly different in force deformation characteristics, test results will be inaccurate, and even the safety belts produced according to the test results will have hidden safety hazards.

In view of this, the present disclosure is proposed.

SUMMARY OF PRESENT INVENTION

In order to solve the foregoing technical problems, the present disclosure provides a method and system for measuring a relationship between crash dummy chest compression and a safety belt load, so as to measure force deformation characteristics of chest of a dummy.

An embodiment of the present disclosure provides a method for measuring a relationship between crash dummy chest compression and a safety belt load. The method includes:
  controlling, when a dummy is fixed in a preset posture on a fixed bed in a test platform via a safety belt in a safety belt restraint apparatus, a chest cover plate in the test platform to move so as to maintain a preset relative position between the chest cover plate and the dummy;
  controlling an impact apparatus to pull the safety belt in each pulling force to be measured, and determining a target displacement value of each measuring point on the dummy and a target pulling force between the impact apparatus and the safety belt after a first preset duration; and
  determining a target pulling force-displacement curve corresponding to each measuring point according to each target displacement value and each target pulling force.

The test platform, the safety belt restraint apparatus and the impact apparatus constitute a system for measuring a relationship between the crash dummy chest compression and the safety belt load.

An embodiment of the present disclosure provides a system for measuring a relationship between crash dummy chest compression and a safety belt load. The system includes: a test platform, a safety belt restraint apparatus, and an impact apparatus.

The test platform includes a fixed bed and a chest cover plate. The fixed bed is used for placing a dummy. The chest cover plate is used for measuring a target displacement value through a displacement sensor mounted on the chest cover plate. One side of the displacement sensor is mounted on the chest cover plate, and another side of the displacement sensor is mounted at each measuring point on the dummy.

The safety belt restraint apparatus includes a safety belt and a pulling force sensor. The safety belt is used for fixing the dummy to the fixed bed. The pulling force sensor is connected to the impact apparatus and the safety belt so as to measure a target pulling force generated by the impact apparatus.

The impact apparatus is used for pulling the safety belt to impact a chest of the dummy by the safety belt.

The embodiments of the present disclosure have the following technical effects:
  when the dummy is fixed in the preset posture on the fixed bed in the test platform via the safety belt in the safety belt restraint apparatus, the chest cover plate in the test platform is controlled to move so as to maintain the preset relative position between the chest cover plate and the dummy, then the impact apparatus is controlled to pull the safety belt in each pulling force to be measured, the target displacement value of each measuring point on the dummy and the target pulling force between the impact apparatus and the safety belt are determined after the first preset duration, and the target pulling force-displacement curve corresponding to each measuring point is determined according to each target displacement value and each target pulling force, so that a problem that force deformation characteristics of the chest of the dummy cannot be accurately determined is solved, and the force deformation characteristics of the chest of the dummy can be measured.

BRIEF DESCRIPTION OF THE DRAWINGS

In order to describe technical solutions in specific implementations of the present disclosure or in the prior art more clearly, the accompanying drawings required in the description of the specific implementations or the prior art will be briefly introduced below. Apparently, the accompanying drawings in the following description show only some implementations of the present disclosure, and those of ordinary skill in the art can still derive other drawings from these drawings without any creative effort.

DESCRIPTION OF THE EMBODIMENTS

In order to make objectives, technical solutions and advantages of the present disclosure clearer, technical solutions of the present disclosure will be described clearly and completely below. Obviously, the described embodiments are only some rather than all embodiments of the present disclosure. Based on the embodiments of the present disclosure, all other embodiments obtained by those of ordinary skill in the art without any creative effort fall within the protection scope of the present disclosure.

A method for measuring a relationship between crash dummy chest compression and a safety belt load according to embodiments of the present disclosure is mainly suitable for measuring a relationship between dummy chest compression and a safety belt load so as to obtain force deformation characteristics of a chest of a dummy. The method for measuring a relationship between the crash dummy chest compression and the safety belt load according to the embodiments of the present disclosure may be integrated in an electronic device and performed by the electronic device.

Figure 1:
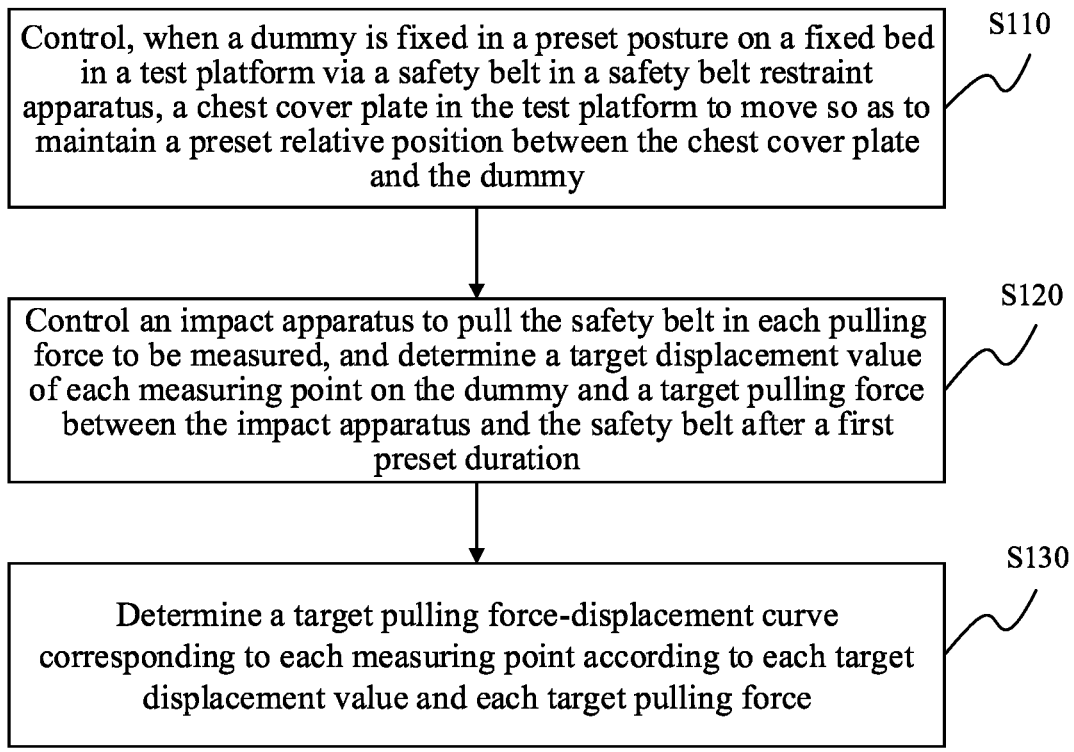
FIG. 1 is a flow diagram of a method for measuring a relationship between crash dummy chest compression and a safety belt load according to an embodiment of the present disclosure.

FIG. 1 is a flow diagram of a method for measuring a relationship between crash dummy chest compression and a safety belt load according to an embodiment of the present disclosure. As shown in FIG. 1, the method for measuring a relationship between the crash dummy chest compression and the safety belt load specifically includes:

S110: When a dummy is fixed in a preset posture on a fixed bed in a test platform via a safety belt in a safety belt restraint apparatus, a chest cover plate in the test platform is controlled to move so as to maintain a preset relative position between the chest cover plate and the dummy.

It should be noted that the test platform, the safety belt restraint apparatus and an impact apparatus constitute a system for measuring a relationship between crash dummy chest compression and a safety belt load. The system is used for performing the method for measuring a relationship between the crash dummy chest compression and the safety belt load according to the embodiment. The test platform is used for placing and fixing the dummy, so that the posture of the dummy can simulate a sitting posture of a passenger in a vehicle; and the test platform is further used for subsequently obtaining a target displacement value according to a displacement sensor in the test platform. The safety belt restraint apparatus is used for connecting the safety belt to a pulling force sensor and enabling the safety belt to be tense to a certain extent so as to fix the dummy on the test platform. The impact apparatus is used for applying an impact force to a chest of the dummy by the safety belt, so as to measure the dummy chest compression and the safety belt load during impact.

The dummy may be a vehicle crash dummy, namely, a dummy used for simulating a real person during a vehicle crash test. It may be understood that the dummy is a test object whose relationship between the chest compression and the safety belt load is to be tested. The preset posture may be a preset posture in which the dummy simulates the sitting posture of a passenger. The fixed bed may be a platform used for providing a horizontal plane for placing the dummy in a flat-lying manner. The chest cover plate may be suspended above the dummy and used for providing a reference position for subsequently obtaining the target displacement value. The preset relative position may be a preset position relationship between the chest cover plate and the dummy, which facilitates subsequent accurate obtaining of the target displacement value.

Specifically, the dummy may be placed in the preset posture on the fixed bed in the test platform and fixed via the safety belt in the safety belt restraint apparatus. By adjusting the chest cover plate in the test platform to move in all directions, the position relationship between the chest cover plate and the dummy satisfies the preset relative position. The directions include a direction along a midline of the dummy (a line connecting the head and a midpoint of a foot) on a plane where the chest cover plate is located, a direction perpendicular to a midline of a human body on the plane where the chest cover plate is located, and a direction perpendicular to the plane where the chest cover plate is located.

Alternatively, the preset posture is to bend thighs of the dummy upwards, enable buttocks of the dummy to be in contact with a first side of a support block in the test platform, enable calves of the dummy to be in contact with a second side of the support block, and put hands of the dummy on the thighs.

Specifically, the support block is used for simulating a seat of a vehicle. A back of the dummy is in contact with the fixed bed, so that a posture that the dummy leans against the vehicle seat may be simulated. The first side of the support block provides support for the buttocks of the dummy. The thighs of the dummy are bent upwards, and the buttocks of the dummy are in contact with the first side of the support block in the test platform, so that a posture that the dummy sits on the first side of the support block may be simulated. The second side of the support block provides support for the calves of the dummy. The calves of the dummy are in contact with the second side of the support block, so that a posture that the calves are naturally bent and put on the second side after the dummy sits on the first side of the support block may be simulated. In addition, the hands of the dummy are put on the thighs, so that simulation of a posture that the dummy sits on the support block and leans against the fixed bed is completed, where the posture is used as the preset posture, so that the sitting posture of the passenger is simulated.

S120: The impact apparatus is controlled to pull the safety belt in each pulling force to be measured, and a target displacement value of each measuring point on the dummy and a target pulling force between the impact apparatus and the safety belt are determined after a first preset duration.

The pulling force to be measured may be a predetermined pulling force to be measured of the safety belt, namely, the safety belt load. The first preset duration may be stable duration provided for safety belt impact and restoration, and the specific duration may be determined according to actual needs, which is not limited in the embodiment, and may be 5 s for example. The measuring point may be a preset reference point on the dummy for displacement measurement, and the reference point on the other side are correspondingly arranged on the chest cover plate. Therefore, a displacement change of the measuring point may be determined according to a distance change between the corresponding reference point. The target displacement value may be a maximum displacement value corresponding to each measuring point when the safety belt impacts the dummy. The target pulling force may be a maximum force applied to the safety belt when the safety belt impacts the dummy, and may be understood as the safety belt load. It should be noted that the target pulling force may be numerically different from the pulling force to be measured due to interference of friction, a rope material, etc. It may be understood that the pulling force to be measured is a theoretical value, while the target pulling force is an actual value. For more accurate subsequent analysis, the target pulling force is measured and recorded.

Specifically, each pulling force to be measured may be tested and measured through the same method, so one pulling force to be measured is used as an example for explanation. The impact apparatus is adjusted according to the pulling force to be measured, so that the impact apparatus pulls the safety belt to impact the chest of the dummy and compress the chest of the dummy. After the first preset duration, the impact ends and the chest of the dummy rebounds. Changes in the displacement value at the measuring point on the chest of the dummy and changes in the pulling force of the safety belt within the first preset duration may be recorded. A maximum value among the changes in the displacement value at each measuring point may be used as the target displacement value corresponding to the measuring point. A maximum value among the changes in the pulling force of the safety belt is used as the target pulling force between the impact apparatus and the safety belt. Through the foregoing method, the target displacement value corresponding to each pulling force to be measured and the target pulling force may be obtained.

For example, one pulling force to be measured is F, and an initial distance between the measuring point and the corresponding point on the chest cover plate is a. Within the first preset duration, the recorded distance changes are a1, a2, a3, a4, and a5, and the computed changes in the displacement value are (a1-a), (a2-a), (a3-a), (a4-a), and (a5-a). The maximum value among the changes in the displacement value is (a3-a), and it may be determined that the target displacement value of the measuring point is (a3-a). Within the first preset duration, the changes in the pulling force of the safety belt are F1, F2, F3, F4, and F5. Among them, the maximum value is F3. Therefore, it may be determined that the target pulling force is F3.

Alternatively, the measuring point on the dummy includes: at least one of a first measuring point at a middle part of a clavicle of the dummy, a second measuring point at an upper part of a sternum of the dummy, a third measuring point at a right side of a middle part of a fourth rib of the dummy, a fourth measuring point at a middle part of the sternum of the dummy, a fifth measuring point at a left side of the middle part of the fourth rib of the dummy, a sixth measuring point at a lower part of the sternum of the dummy, and a seventh measuring point at a right side of a middle part of a fifth rib of the dummy.

Specifically, the safety belt is worn over the human clavicle, sternum, and ribs, and the main stressed bone positions are the middle part of the clavicle, the middle part of the sternum, the fourth rib, and the fifth rib. Accordingly, seven test points as shown in FIG. 2 may be set, including a first measuring point 41, a second measuring point 42, a third measuring point 43, a fourth measuring point 44, a fifth measuring point 45, a sixth measuring point 46, and a seventh measuring point 47.

Alternatively, one or more of the seven test points may be used as a test point/test points. Of course, alternatively, other preset test points may be used.

Figure 2:
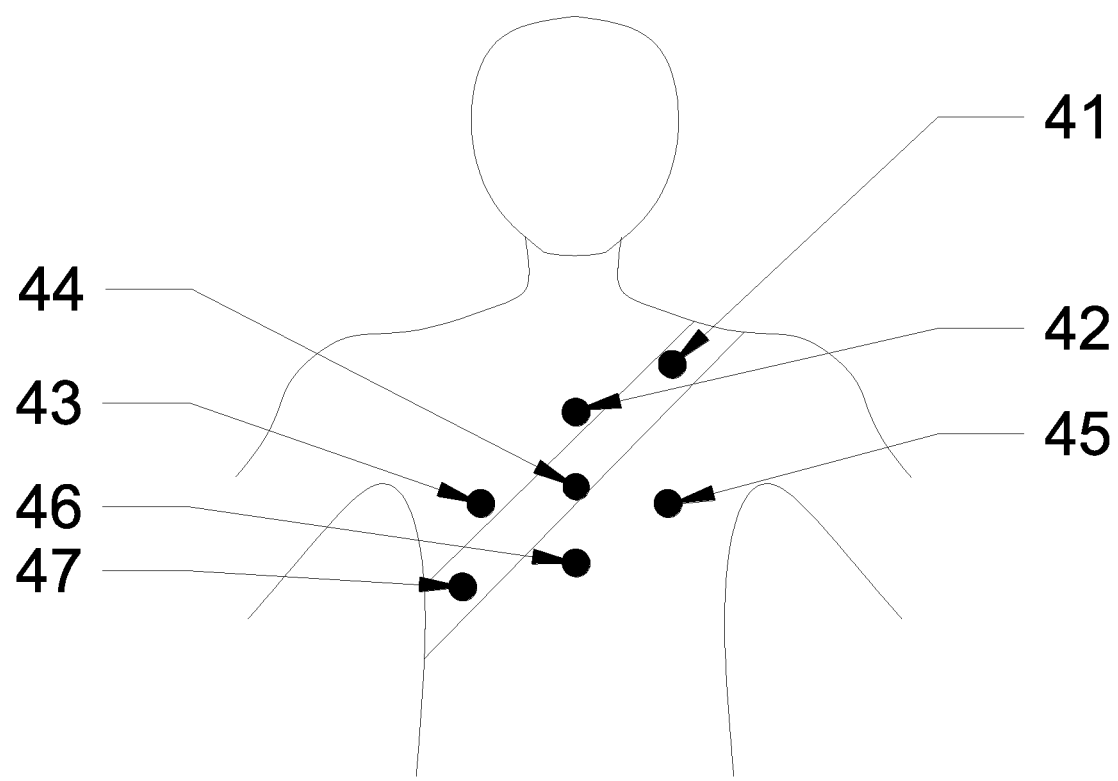
FIG. 2 is a schematic diagram of seven test points according to an embodiment of the present disclosure.
Figure 3:
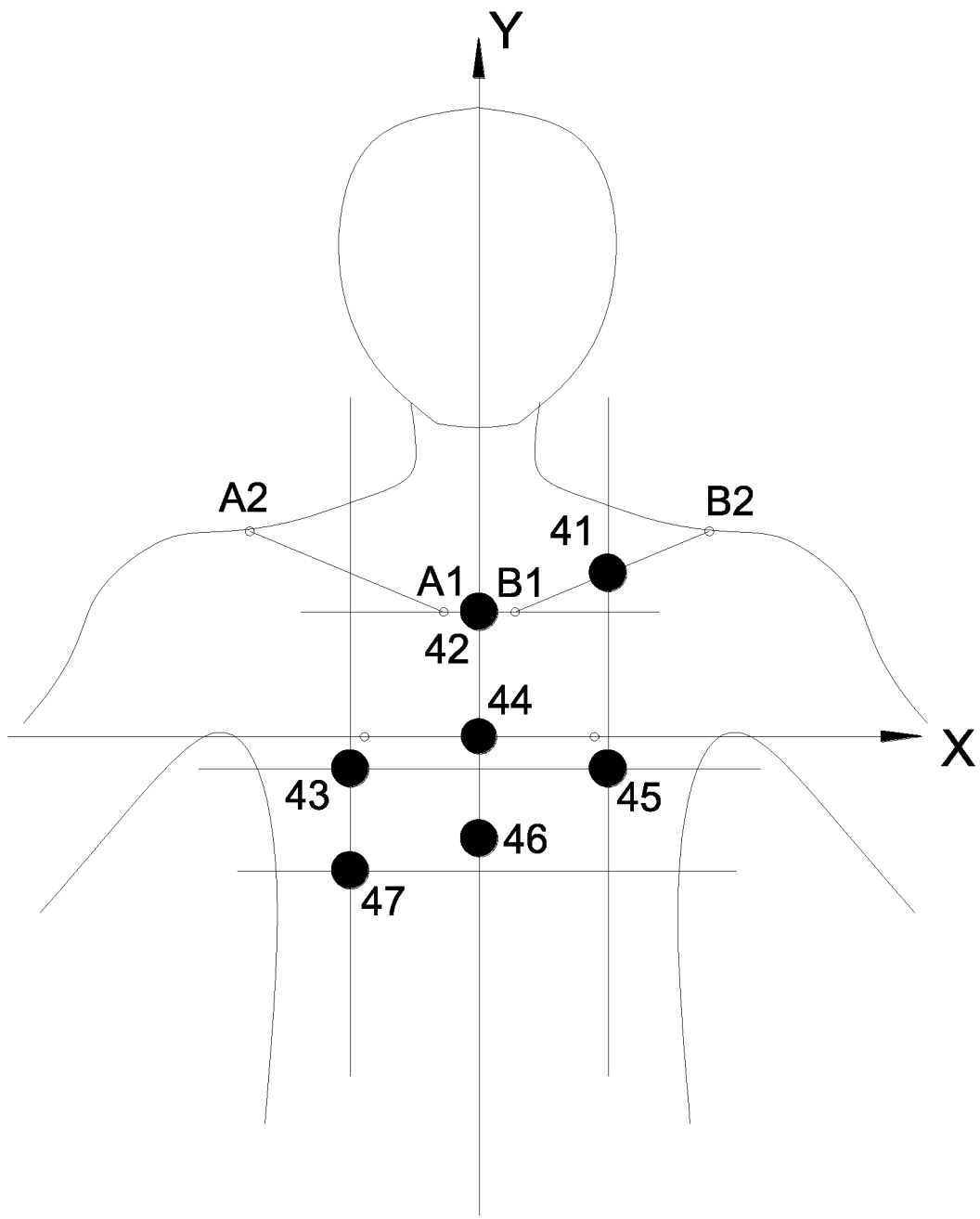
FIG. 3 is a schematic diagram of seven test points in a rectangular plane coordinate system according to an embodiment of the present disclosure.

For example, the seven test points shown in FIG. 2 may be determined by combining bone touching and a measurement method. The chest of the dummy simulates a human chest, and has prominent calibration points on bones, which may be used for marking some points. A midpoint of two nipples may be marked as an origin, a line connecting the two nipples is an abscissa axis, a vertical axis is established across an origin and perpendicular to the abscissa axis, and thus a rectangular plane coordinate system may be established as shown in FIG. 3. The vertical axis is referred to as an anterior median line, and the origin of the coordinate system may be considered as the middle part of the sternum, which is denoted as the fourth measuring point 44. By touching the bones, the clavicles on two sides may be marked separately, with A1 and A2 marked on the left and B1 and B2 marked on the right. B1 and B2 on the right are connected to each other as endpoints, and the midpoint of the line connecting the two points is used as the middle part of the clavicle, which is denoted as the first measuring point 41. A straight line is drawn across the first measuring point 41 and parallel to the vertical axis, which is denoted as the midline of the clavicle (the left side). Accordingly, the midline of the clavicle (the right side) may also be obtained. A1 and B1 are connected and their midpoint is used as the upper part of the sternum, which is denoted as the second measuring point 42. It may be seen through anatomy that, when a normal human body lies flat, the nipples are opposite fourth intercostal space, and the fourth rib below may be touched. A line parallel to the fourth rib is drawn, the line is intersected with the midline of the clavicle (the left side) so as to obtain the left side of the middle part of the fourth rib, which is denoted as the fifth measuring point 45, and the line is intersected with the midline of the clavicle (the right side) so as to obtain the right side of the middle part of the fourth rib, which is denoted as the third measuring point 43. A depressed portion, touched from the anterior median line downwards, is the measuring point at the lower part of the sternum, which is denoted as the sixth measuring point 46. The fifth rib may be touched from the fourth rib downwards, a line parallel to the abscissa axis is drawn on the fifth rib, and the line is intersected with the midline of the clavicle (the right side) so as to obtain the right side of the middle part of the fifth rib, which is denoted as the seventh measuring point 47.

S130: a target pulling force-displacement curve corresponding to each measuring point is determined according to each target displacement value and each target pulling force.

The target pulling force-displacement curve may be a fitted curve about changes in a displacement value with a pulling force value, and is used for recording the relationship between the chest compression and the safety belt load at each measuring point.

Specifically, a plurality of target pulling forces corresponding to the measuring point and a target displacement value corresponding to each target pulling force may be determined, a curve that the displacement value changes with the pulling force may be fitted according to each target pulling force and the target displacement value corresponding to each target pulling force, and the curve is the target pulling force-displacement curve corresponding to the measuring point. Through the above method, the target pulling force-displacement curve corresponding to the measuring point may be fitted, that is, the relationship between the chest compression and the safety belt load at each measuring point may be obtained.

This embodiment has the following technical effects: when the dummy is fixed in the preset posture on the fixed bed in the test platform via the safety belt in the safety belt restraint apparatus, the chest cover plate in the test platform is controlled to move so as to maintain the preset relative position between the chest cover plate and the dummy, then the impact apparatus is controlled to pull the safety belt in each pulling force to be measured, the target displacement value of each measuring point on the dummy and the target pulling force between the impact apparatus and the safety belt are determined after the first preset duration, and the target pulling force-displacement curve corresponding to each measuring point is determined according to each target displacement value and each target pulling force, so that a problem that force deformation characteristics of the chest of the dummy cannot be accurately determined is solved, and the force deformation characteristics of the chest of the dummy can measured.

Figure 4:
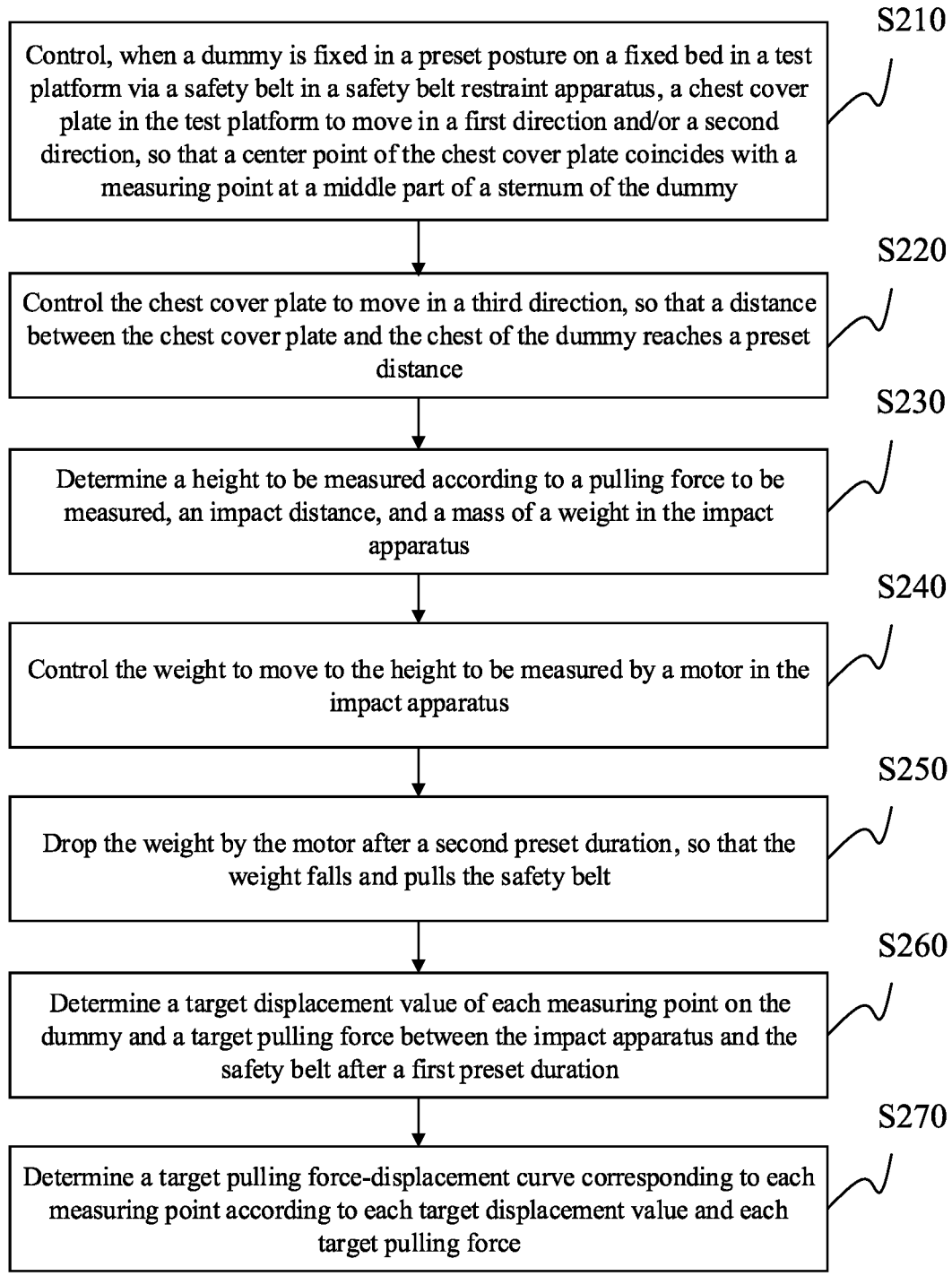
FIG. 4 is a flow diagram of another method for measuring a relationship between crash dummy chest compression and a safety belt load according to an embodiment of the present disclosure.

FIG. 4 is a flow diagram of another method for measuring a relationship between crash dummy chest compression and a safety belt load according to an embodiment of the present disclosure. Based on the foregoing embodiment, methods of controlling the chest cover plate to move and controlling the impact apparatus to pull the safety belt may be described in detail in the embodiment with reference to the technical solution. The explanations of terms the same as or corresponding to those in the foregoing embodiments will not be repeated herein. As shown in FIG. 4, the method for measuring a relationship between the crash dummy chest compression and the safety belt load specifically includes:

S210: when a dummy is fixed in a preset posture on a fixed bed in a test platform via a safety belt in a safety belt restraint apparatus, a chest cover plate in the test platform is controlled to move in a first direction and/or a second direction, so that a center point of the chest cover plate coincides with a measuring point at the middle part of the sternum of the dummy.

The first direction may be a direction of the midline of the dummy, such as the direction of X axis shown in FIG. 3, and the second direction may be a direction perpendicular to the first direction on a plane where the chest cover plate is located, such as the direction of Y axis shown in FIG. 3. The measuring point at the middle part of the sternum of the dummy may be a fourth measuring point 44 as shown in FIG. 3.

Specifically, when the dummy is fixed in the preset posture on the fixed bed in the test platform via the safety belt in the safety belt restraint apparatus, the chest cover plate is moved in the first direction and/or the second direction until the center point of the chest cover plate coincides with the measuring point at the middle part of the sternum of the dummy in a direction perpendicular to a horizontal plane.

S220: the chest cover plate is controlled to move in a third direction, so that a distance between the chest cover plate and the chest of the dummy reaches a preset distance.

The third direction may be a direction perpendicular to the plane where the chest cover plate is located. The preset distance may be a preset height difference between the chest cover plate and the chest of the dummy. For example, the preset distance may be in a range of 20 cm-25 cm, and a specific value may be set according to actual needs.

Specifically, the height of the chest cover plate is adjusted in the third direction, and the adjustment is stopped when the distance between the chest cover plate and the chest of the dummy reaches the preset distance.

S230: A height to be measured is determined according to a pulling force to be measured, an impact distance, and a mass of a weight in the impact apparatus.

The impact distance may be a distance used for generating the pulling force to be measured, that is, a distance of movement along the pulling force to be measured. The weight may be an object used for generating force through falling. The weight is connected to the safety belt through a pulling force sensor. The pulling force sensor is used for measuring a pulling force on the safety belt, namely, a safety belt load. The height to be measured may be a height of lifting the weight from a free rest position, namely, a starting height of subsequent free-falling movement.

Specifically, the height to be measured of the weight in the pulling force to be measured may be determined through the following method, so one pulling force to be measured is used as an example for explanation. The height to be measured H may be computed through a force work formula mgH-FS according to the pulling force to be measured F, the impact distance S, and the mass m of the weight to measure the pulling force.

For example, the pulling force to be measured F is 1500 N, the mass m of the weight is 10 kg, the impact distance S is 5 cm, and the height to be measured H may be computed through the formula mgH=FS so as to obtain 75 cm.

S240: the weight is controlled to move to the height to be measured by a motor in the impact apparatus.

The motor may be used for lifting or dropping the weight.

Specifically, the weight is lifted up by the motor in the impact apparatus until a rising distance of the weight is the height to be measured.

S250: the weight is dropped by the motor after a second preset duration, so that the weight falls and pulls the safety belt.

The second preset duration may be preset duration for waiting for the weight to rise and stabilize, and the specific duration may be set according to needs, for example 10 s.

Specifically, the weight remains stationary for the second preset duration after moving to the height to be measured. The motor is controlled, so that the weight falls freely to pull the safety belt.

S260: a target displacement value at each measuring point on the dummy and a target pulling force between the impact apparatus and the safety belt are determined after a first preset duration.

S270: a target pulling force-displacement curve corresponding to each measuring point is determined according to each target displacement value and each target pulling force.

Alternatively, after the target pulling force-displacement curve corresponding to each measuring point is determined, the target pulling force-displacement curve may be further compared with a real pulling force-displacement curve so as to evaluate whether the chest of the dummy is consistent with a chest of a real person, specifically, a chest of the dummy simulation effect is determined according to the target pulling force-displacement curve and a predetermined real pulling force-displacement curve.

The real pulling force-displacement curve may be a pre-measured curve about changes in displacement of the chest of the real person with the pulling force, and the curve may also be measured through S110-S130, S210-S270, etc. The chest simulation effect may be a degree of matching between the chest of the dummy and the chest of the real person.

Specifically, similarity matching may be performed on the target pulling force-displacement curve and the predetermined real pulling force-displacement curve in a preset matching mode, and a degree of matching is used as a simulation effect of the chest of the dummy.

For example, the similarity matching mode may be curve distance similarity matching, or point-based distance matching, such as the Euclidean distance, dynamic time warping, the longest public string, and the editing distance, or shape-based distance matching, such as the Hausdorff distance and the Fréchet distance, or segmentation-based distance matching, such as the one-way distance and the multi-line position distance. The similarity matching mode may also be correlation analysis. An appropriate similarity matching mode may be selected according to actual needs, and is not limited in the embodiment.

It should be noted that the matching uses the target pulling force-displacement curve and the real pulling force-displacement curve of the same measuring point so as to ensure the accuracy of matching degree measurement.

The embodiment has the following technical effects: the chest cover plate in the test platform is controlled to move in the first direction and/or the second direction, so that the center point of the chest cover plate coincide with the measuring point at the middle part of the sternum of the dummy; the chest cover plate in the test platform is also controlled to move in the third direction, so that the distance between the chest cover plate and the chest of the dummy reaches the preset distance; then the height to be measured is determined according to the pulling force to be measured, the impact distance, and the mass of the weight in the impact apparatus; the weight is controlled to move to the height to be measured by the motor in the impact apparatus; the weight is dropped by the motor after a second preset duration, so that the weight falls and pulls the safety belt; and therefore, the problem that the impact of the safety belt on the chest of the dummy cannot be accurately simulated is solved, a process of impact of the safety belt on the chest of the dummy is simulated, and force deformation characteristics of the chest of the dummy can be measured.

Whether a dummy can replace a real person for vehicle crash simulation mainly depends on a calibration test, the chest of the dummy is currently calibrated by using a pendulum impact machine, and the test mainly determines the force applied to the chest by a blunt impactor and the displacement of the chest. However, the safety belt on an upper trunk cannot be considered as the blunt impactor, so the test result obtained through the above test is not accurate.

Figure 5:
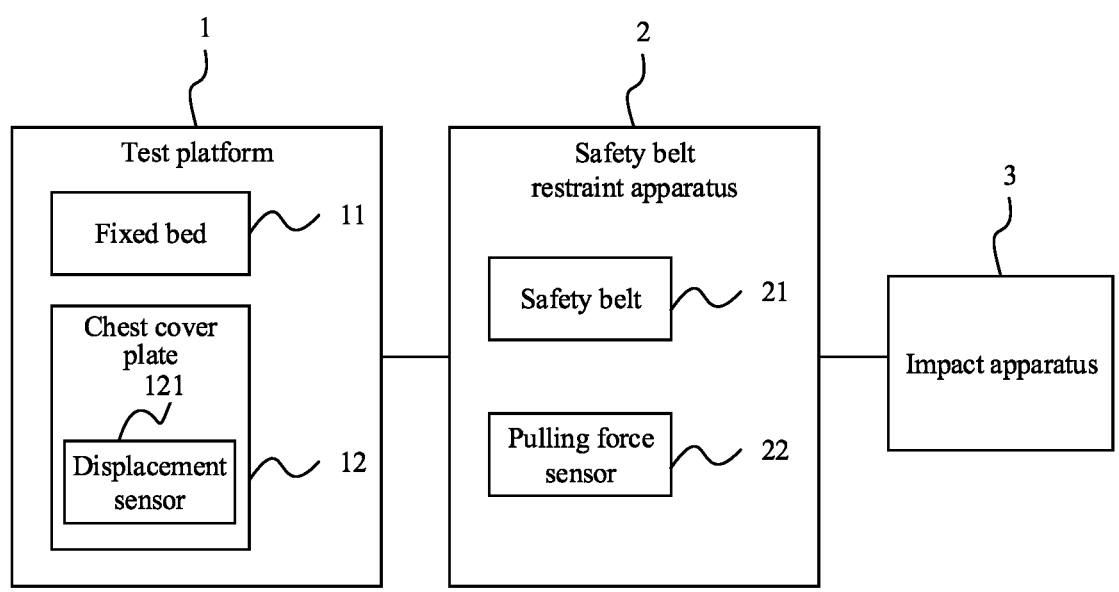
FIG. 5 is a schematic structural diagram of a system for measuring a relationship between dummy chest compression and a safety belt load according to an embodiment of the present disclosure.
Figure 6:
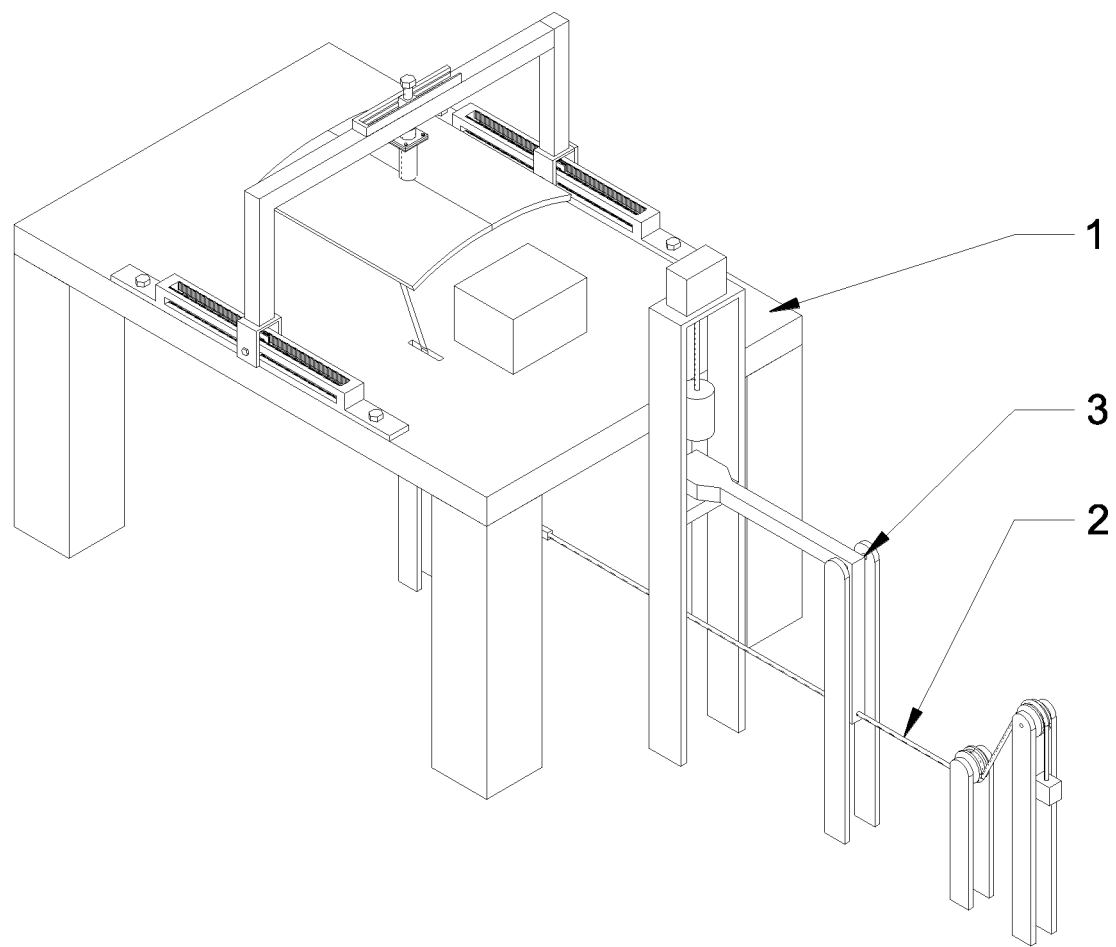
FIG. 6 is an isometric view of a system for measuring a relationship between dummy chest compression and a safety belt load according to an embodiment of the present disclosure.

FIG. 5 is a schematic structural diagram of a system for measuring a relationship between dummy chest compression and a safety belt load according to an embodiment of the present disclosure. The explanations of terms the same as or corresponding to those in the foregoing embodiments will not be repeated herein. As shown in FIG. 5, the system for measuring a relationship between dummy chest compression and a safety belt load includes: a test platform 1, a safety belt restraint apparatus 2, and an impact apparatus 3. For example, FIG. 6 is an isometric view of a system for measuring a relationship between dummy chest compression and a safety belt load according to an embodiment of the present disclosure.

The test platform 1 includes a fixed bed 11 and a chest cover plate 12. The fixed bed 11 is used for placing a dummy. The chest cover plate 12 is used for measuring a target displacement value through a displacement sensor 121 mounted on the chest cover plate 12. One side of each displacement sensor 121 is mounted on the chest cover plate 12, and another side of the displacement sensor 121 is mounted at each measuring point on the dummy. The safety belt restraint apparatus 2 includes a safety belt 21 and a pulling force sensor 22. The safety belt 21 is used for fixing the dummy to the fixed bed 11. The pulling force sensor 22 is connected to the impact apparatus 3 and the safety belt 21 so as to measure a target pulling force generated by the impact apparatus 3. The impact apparatus 3 is used for pulling the safety belt 21 to impact a chest of the dummy by the safety belt 21.

Specifically, the dummy may be placed in a preset posture on the fixed bed 11, and the chest cover plate 12 may be suspended above the chest of the dummy. A specific position relationship between the chest cover plate 12 and the chest of the dummy may be a preset relative position. The displacement sensor 121 may be a draw-wire displacement sensor. One side of the displacement sensor 121 is mounted on the chest cover plate 12, and another side is arranged at each measuring position to determine movement of each measuring point on the chest of the dummy by measuring a target displacement value, so that compression of the chest of the dummy is determined. The safety belt 21 may pass each measuring point on the chest of the dummy so as to fix the dummy to the fixed bed 11. The target pulling force of the impact apparatus 3 on the safety belt 21, namely, the safety belt load, may be measured through the pulling force sensor 22 connected to the safety belt 21 and the impact apparatus 3.

The embodiment has the following technical effects: when the dummy is fixed in the preset posture on the fixed bed in the test platform via the safety belt in the safety belt restraint apparatus, the chest cover plate in the test platform is controlled to move so as to maintain the preset relative position between the chest cover plate and the dummy, then the impact apparatus is controlled to pull the safety belt in each pulling force to be measured, the target displacement value of each measuring point on the dummy and the target pulling force between the impact apparatus and the safety belt are determined after the first preset duration, and the target pulling force-displacement curve corresponding to each measuring point is determined according to each target displacement value and each target pulling force, so that a problem that force deformation characteristics of the chest of the dummy cannot be accurately determined is solved, and the force deformation characteristics of the chest of the dummy can be measured.

Figure 7:
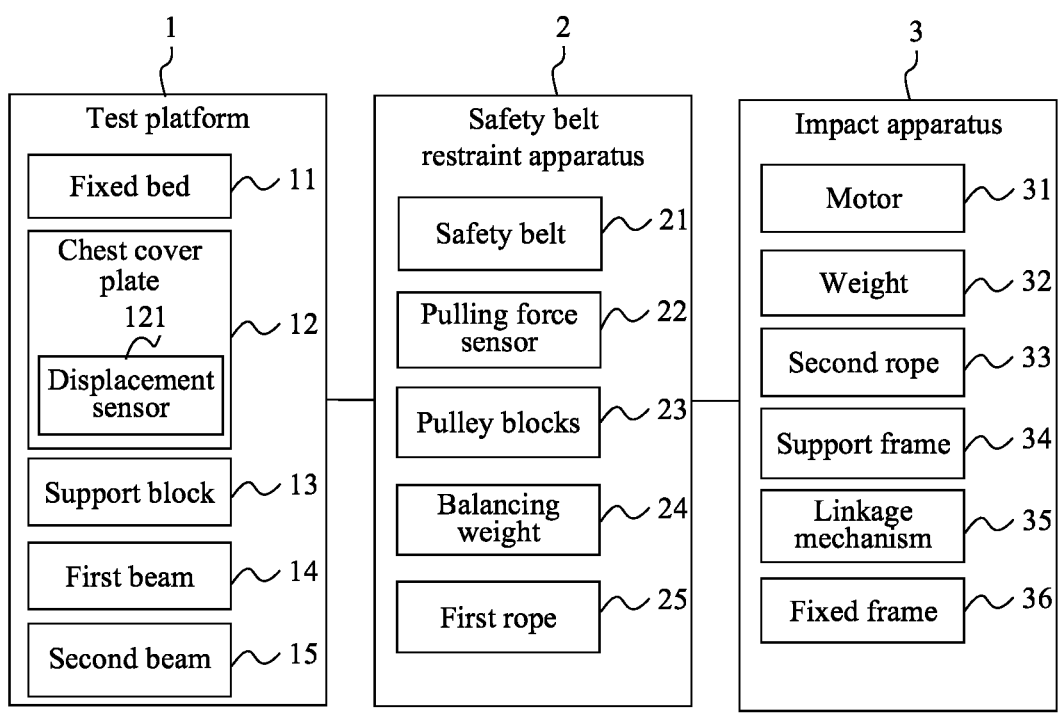
FIG. 7 is a schematic structural diagram of another system for measuring a relationship between dummy chest compression and a safety belt load according to an embodiment of the present disclosure.

FIG. 7 is a schematic structural diagram of another system for measuring a relationship between dummy chest compression and a safety belt load according to an embodiment of the present disclosure.

With reference to FIG. 7, the test platform 1 further includes: a support block 13, a first beam 14, and a second beam 15.

The support block 13 is used for supporting the dummy in a preset posture. The first beam 14 is used for providing a moving track for the chest cover plate 12 to move in the first direction. The second beam 15 is used for providing a moving track for the chest cover plate 12 to move in the second direction.

Specifically, the support block 13 may be arranged on the fixed bed 11 so as to maintain the dummy in the preset posture. For example, the preset posture is to bend thighs of the dummy upwards, enable buttocks of the dummy to be in contact with a first side of the support block 13, enable calves of the dummy to be in contact with a second side of the support block 13, and put hands of the dummy on the thighs. The chest cover plate 12 may be suspended over the first beam 14. The chest cover plate 12 moves back and forth horizontally on the first beam 14, that is, the chest cover plate 12 moves in the first direction; the first beam 14 moves back and forth on the second beam 15, that is, the chest cover plate 12 moves in the second direction; and the chest cover plate 12 moves back and forth longitudinally on the first beam 14, that is, the chest cover plate 12 moves in the third direction.

With reference to FIG. 7, the safety belt restraint apparatus 2 further includes: at least three pulley blocks 23, a balancing weight 24, and a first rope 25.

The first rope 25 is used for connecting the safety belt 21 and the balancing weight 24 through the at least three pulley blocks 23. The balancing weight 24 is used for tensioning the safety belt 21 through the first rope 25 to fix the dummy.

Specifically, the balancing weight 24 is tied to one end of the first rope 25, and the safety belt 21 is tied to the other end of the first rope. The first rope 25 may change a direction of force through the at least three pulley blocks 23 so as to connect the safety belt 21 and the balancing weight 24. Through the gravity of the balancing weight 24, a pulling force is applied to the safety belt 21 through the first rope 25 and the at least three pulley blocks 23, so that the safety belt 21 can still fix the dummy in the absence of impact.

With reference to FIG. 7, the impact apparatus 3 includes: a motor 31, a weight 32, and a second rope 33.

The second rope 33 is used for connecting the motor 31 and the weight 32. The motor 31 is used for controlling movement of the weight 32 through the second rope 33. The weight 32 is used for pulling the safety belt 21 through a force generated by falling, so that the safety belt 21 impacts the chest of the dummy.

Specifically, the motor 31 and the weight 32 may be connected through the second rope 33, and the motor 31 operates to pull the second rope 33 upwards, so that the weight 32 rises to a height to be measured. The motor 31 may also drop the weight 32 by releasing the second rope 33.

The force generated by falling of the weight 32 may pull the safety belt 21, so that the safety belt 21 can impact the chest of the dummy.

With reference to FIG. 7, the impact apparatus 3 further includes: a support frame 34, a linkage mechanism 35, and a fixed frame 36 corresponding to the linkage mechanism 35.

The support frame 34 is used for placing the motor 31 and limiting movement of the linkage mechanism 35. The linkage mechanism 35 is used for transmitting the force generated by falling of the weight 32 to the first rope 25 in the safety belt restraint apparatus 2 so as to pull the safety belt 21 through the first rope 25, so that the safety belt 21 impacts the chest of the dummy. The fixed frame 36 is used for fixing the linkage mechanism 35 to a preset position.

Specifically, the motor 31 may be supported by an upper end of the support frame 34. Displacement of the linkage mechanism 35 after being hit by the weight 32 may be limited through the support frame 34. The linkage mechanism 35 may include a cross rod and a longitudinal rod connected to one end of the cross rod. The cross rod may be as long as the longitudinal rod. The weight 32 falls to hit the cross rod of the linkage mechanism 35, so as to generate a vertical downward force on the cross rod. The cross rod moves down to drive the longitudinal rod to move up, so as to generate an upward force on the longitudinal rod. The first rope 25 is pulled through the upward force to pull the safety belt 21, so that the safety belt 21 impacts the chest of the dummy. The fixed frame 36 provides support for the linkage mechanism 35, so that the linkage mechanism 35 can rotate about a fulcrum at the joint of the cross rod and the longitudinal rod.

Figure 8:
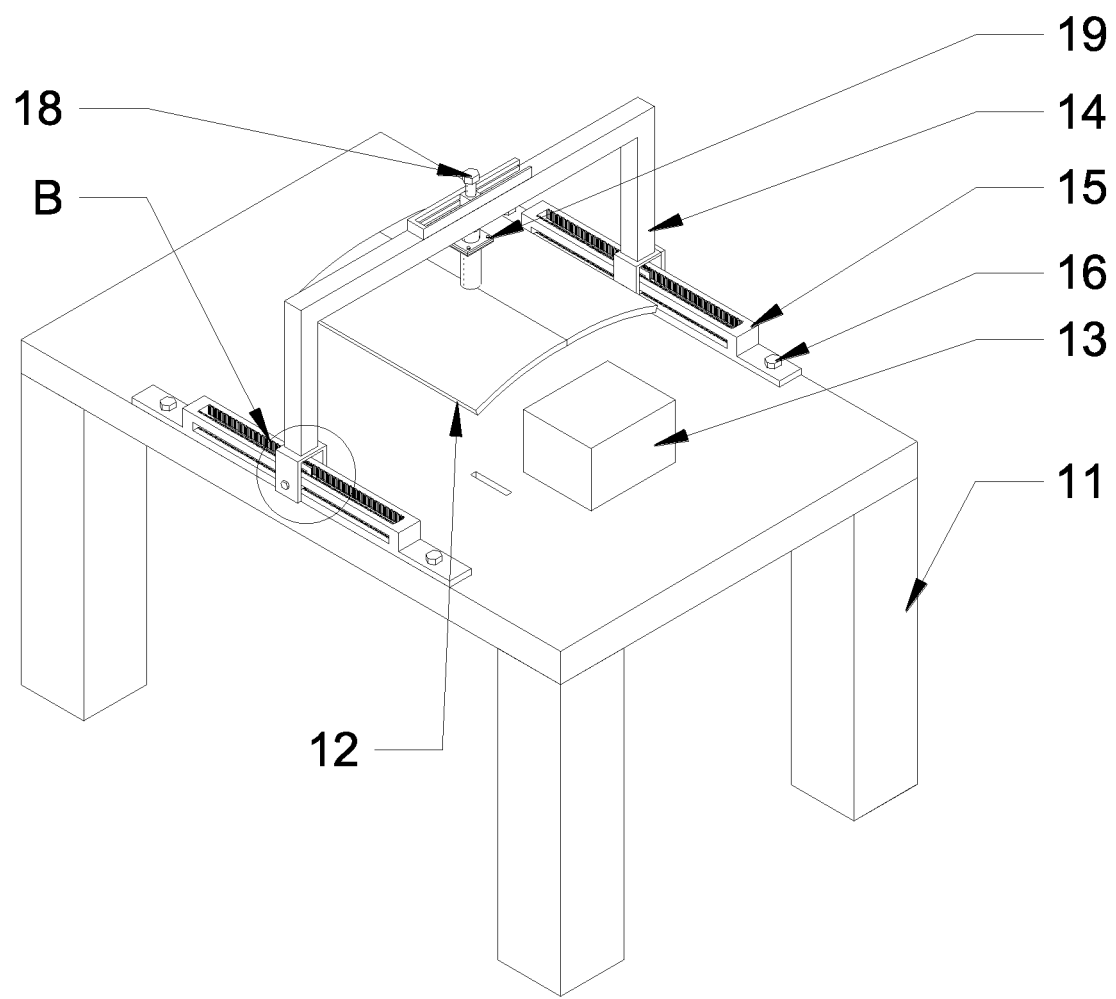
FIG. 8 is an isometric view of a test platform according to an embodiment of the present disclosure.

Alternatively, the isometric view of the test platform 1 is shown in FIG. 8.

Figure 9:
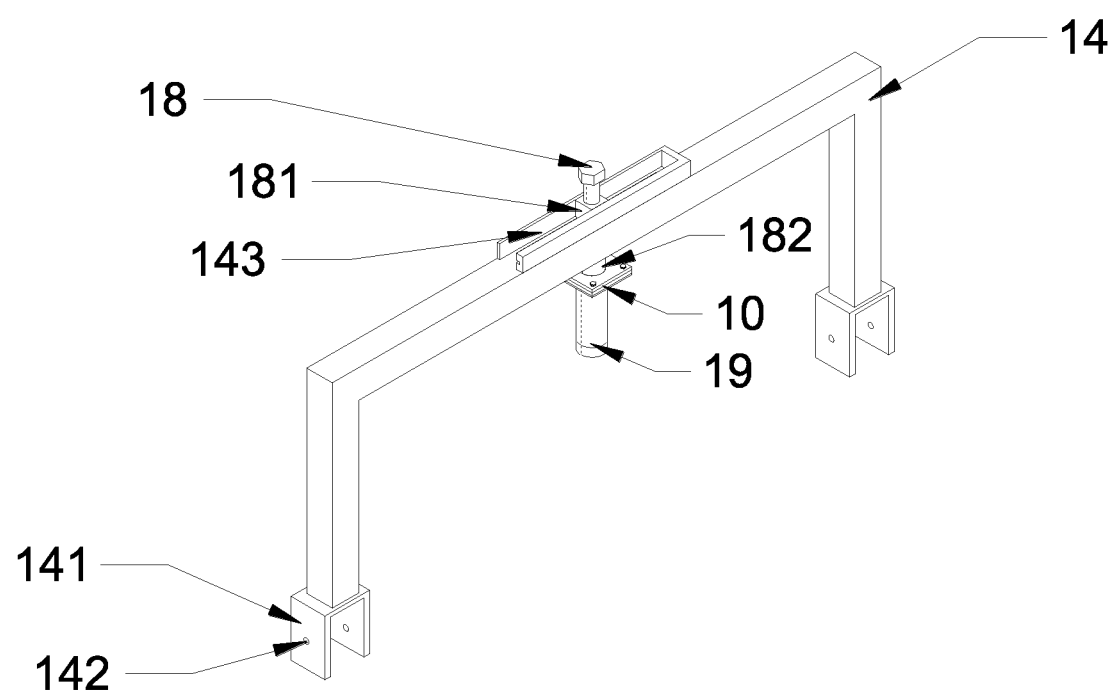
FIG. 9 is a schematic structural diagram of cooperation between a first beam and a first adjusting bolt according to an embodiment of the present disclosure.
Figure 10:
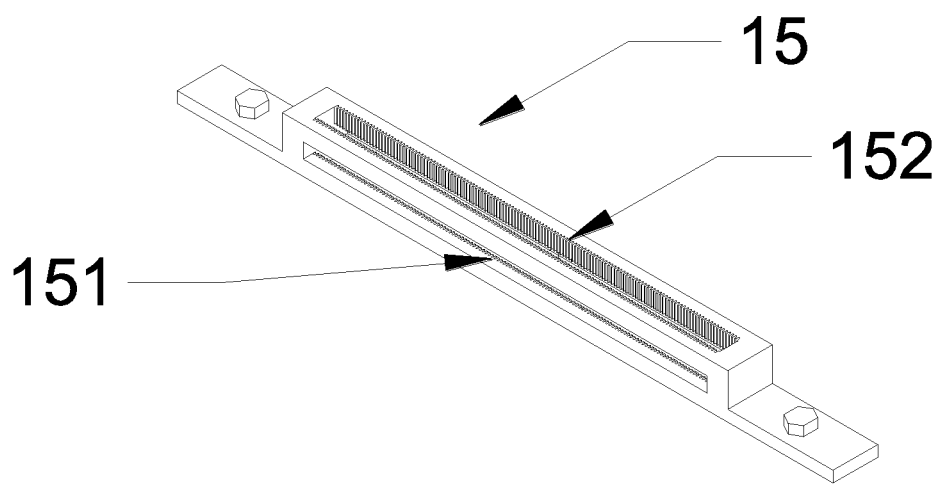
FIG. 10 is a schematic diagram of a second beam according to an embodiment of the present disclosure.
Figure 11:
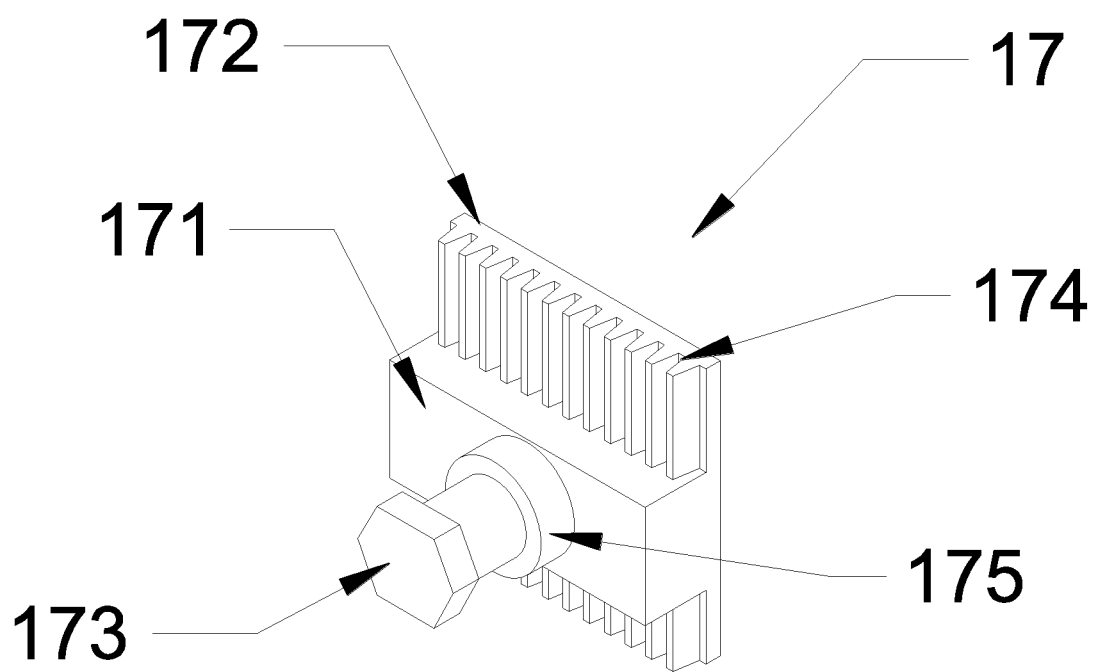
FIG. 11 is an isometric view of a clamping apparatus according to an embodiment of the present disclosure.
Figure 12:
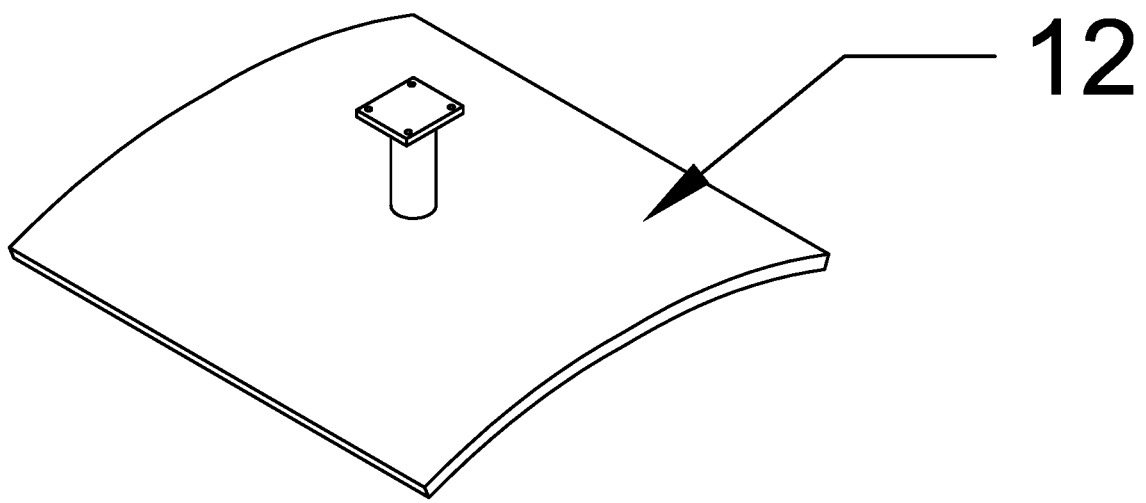
FIG. 12 is an isometric view of a chest cover plate according to an embodiment of the present disclosure.
Figure 13:
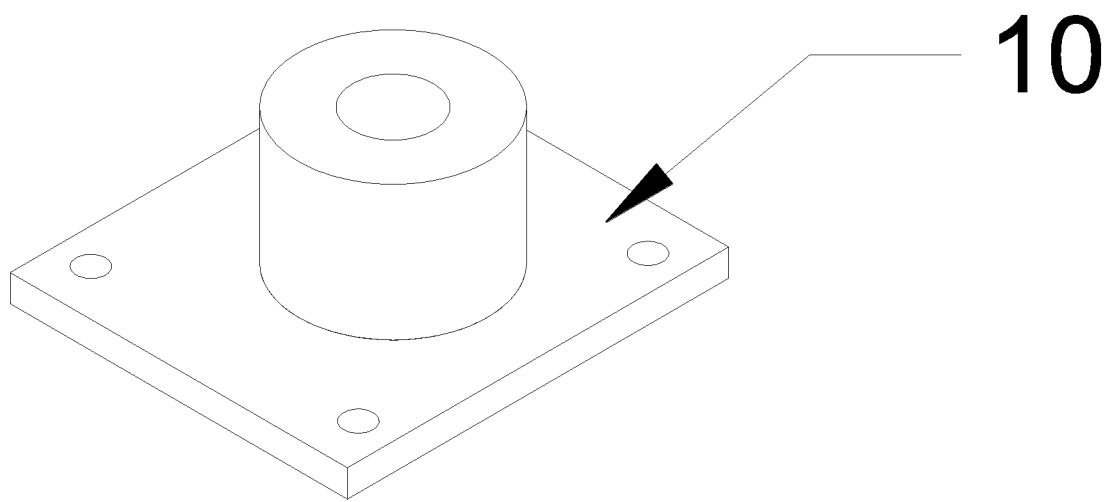
FIG. 13 is an isometric view of a connecting plate according to an embodiment of the present disclosure.
Figure 14:
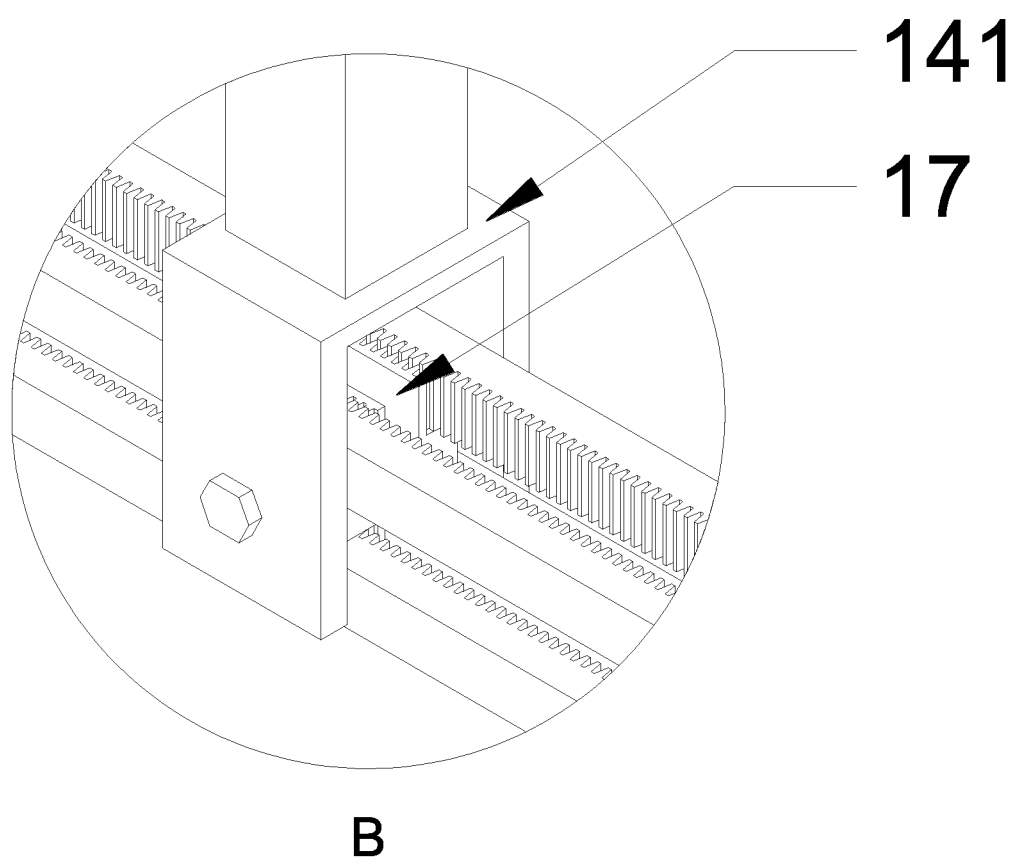
FIG. 14 is a schematic diagram of connection between a first beam and a second beam through a clamping apparatus according to an embodiment of the present disclosure.
Figure 15:
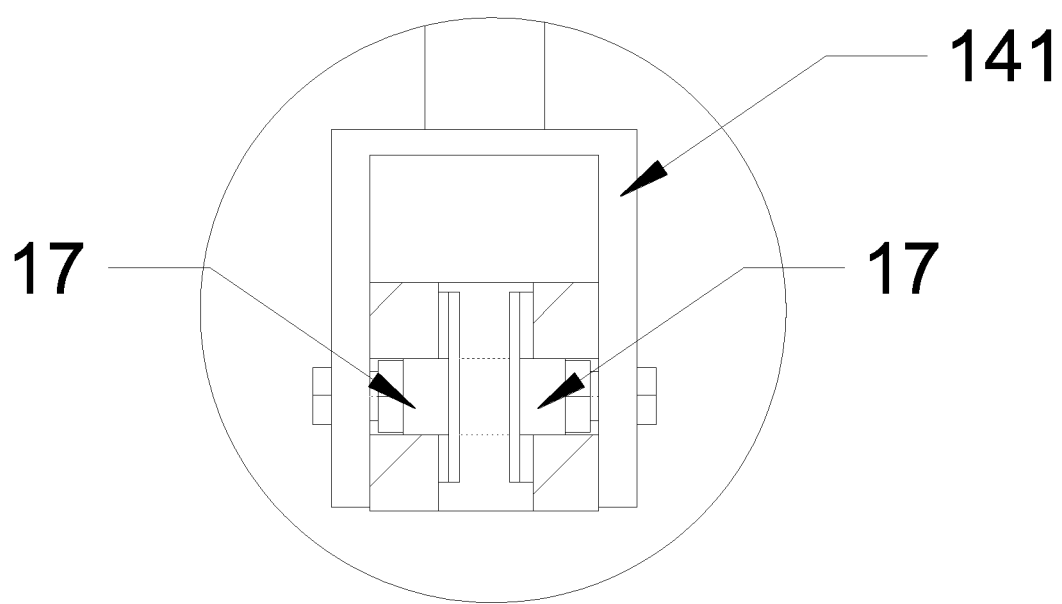
FIG. 15 is a schematic plan view of FIG. 14.

The test platform 1 includes: a fixed bed 11, a chest cover plate 12, a support block 13, a first beam 14 (as shown in FIG. 9, its bottom is positioned with second beams 15 through clamping apparatuses 17), the second beams 15 (as shown in FIG. 10), first screws 16, the clamping apparatuses 17, a first adjusting bolt 18, a second screw 19, and a connecting plate 10. The isometric view of the clamping apparatus 17 is shown in FIG. 11, the isometric view of the chest cover plate 12 is shown in FIG. 12, the isometric view of the connecting plate 10 is shown in FIG. 13, B in FIG. 8 represents the connection between the first beam 14 and the second beam 15 through the clamping apparatus 17, and the specific connection diagram is shown in FIG. 14 and FIG. 15.

Specifically, the support block 13 is used for supporting the calves of the dummy so as to simulate an actual sitting posture. The second beams 15 are connected to the fixed bed 11 through the first screws 16. As shown in FIG. 10, square grooves 151 are arranged on opposite two side walls of the second beam 15, and a plurality of first gullets 152 are arranged on opposite sides of the two side walls. As shown in FIG. 9, the first beam 14 is n-shaped and is provided with two groove-shaped bottoms 141, each groove-shaped bottom 141 corresponds to one of the second beams 15 is fixed to the second beam 15 through the clamping apparatus 17, and through holes 142 are arranged in the middle of each groove-shaped bottom 141. As shown in FIG. 11, the clamping apparatus 17 includes a second adjusting bolt 173, a protruding block 171 integrally connected to a meshing plate 172, the protruding block 171 is provided with a thread groove 175, and the meshing plate 172 is provided with a plurality of second gullets 174 that may mesh with the first gullets 152. As shown in FIG. 14 and FIG. 15, two clamping apparatuses 17 are arranged in each groove-shaped bottom 141, and the protruding blocks 171 of the two clamping apparatuses 17 are clamped in the square grooves 151 on the two side walls of the second beam 15 respectively, to prevent the clamping apparatuses 17 from falling. After the clamping apparatuses 17 move (i.e., the chest cover plate 12 moves in the second direction) to a suitable position, the first gullets 152 mesh with the second gullets 174, and the second adjusting bolt 173 passes through the through holes 142 of the groove-shaped bottom 141 and enters thread groove 175 to be tightened, so that the fixing of the first beam 14 and the second beam 15 by the clamping apparatus can be achieved.

Figure 16:
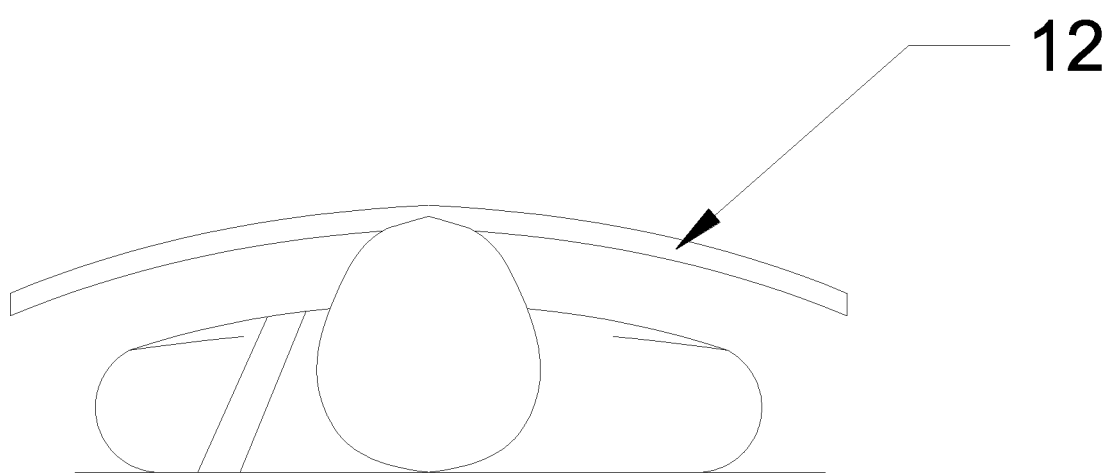
FIG. 16 is a schematic diagram of placement of a chest cover plate and a dummy according to an embodiment of the present disclosure.

As shown in FIG. 8 and FIG. 9, a chute 143 is arranged in the middle of the top of the first beam 14, the first adjusting bolt 18 is threaded with a slider 181, and the slider is slidably engaged with the chute, that is, the chest cover plate 12 moves in the first direction. One end of the first adjusting bolt 18 passing through the chute is connected to an adjusting column 182, a threaded through hole is arranged inside the adjusting column 182, and the first adjusting bolt 18 is threadedly connected to the adjusting column 182, so that the first adjusting bolt 18 may rotate and move up and down relative to the first beam 14, that is, the chest cover plate 12 moves in the third direction. The chest cover plate 12 is connected to the connecting plate 10 through the second screw 19, and the connecting plate 10 is connected to the lower part of the adjusting column 182. Upper and lower positions of the chest cover plate 12 are adjusted by rotating the first adjusting bolt 18. The chest cover plate 12 functions to provide a reference for the displacement sensor. The chest cover plate 12 and the dummy are placed as shown in FIG. 16.

Figure 17:
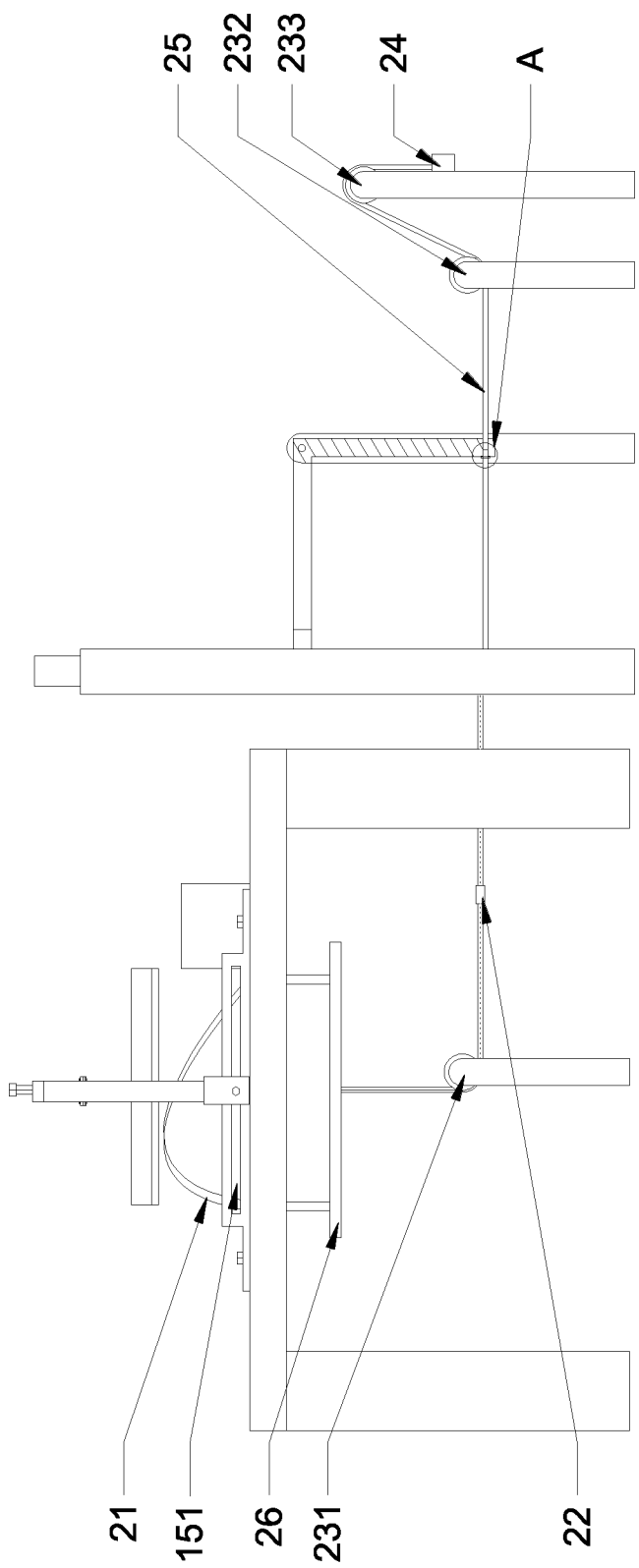
FIG. 17 is a side view of a system for measuring a relationship between dummy chest compression and a safety belt load according to an embodiment of the present disclosure.

Alternatively, a side view of the system for measuring a relationship between dummy chest compression and a safety belt load is shown in FIG. 17.

The safety belt restraint apparatus 2 includes: a safety belt 21, a pulling force sensor 22, a first pulley block 231, a second pulley block 232, a third pulley block 233, a balancing weight 24, a first rope 25, and a safety belt connecting plate 26.

Figure 18:
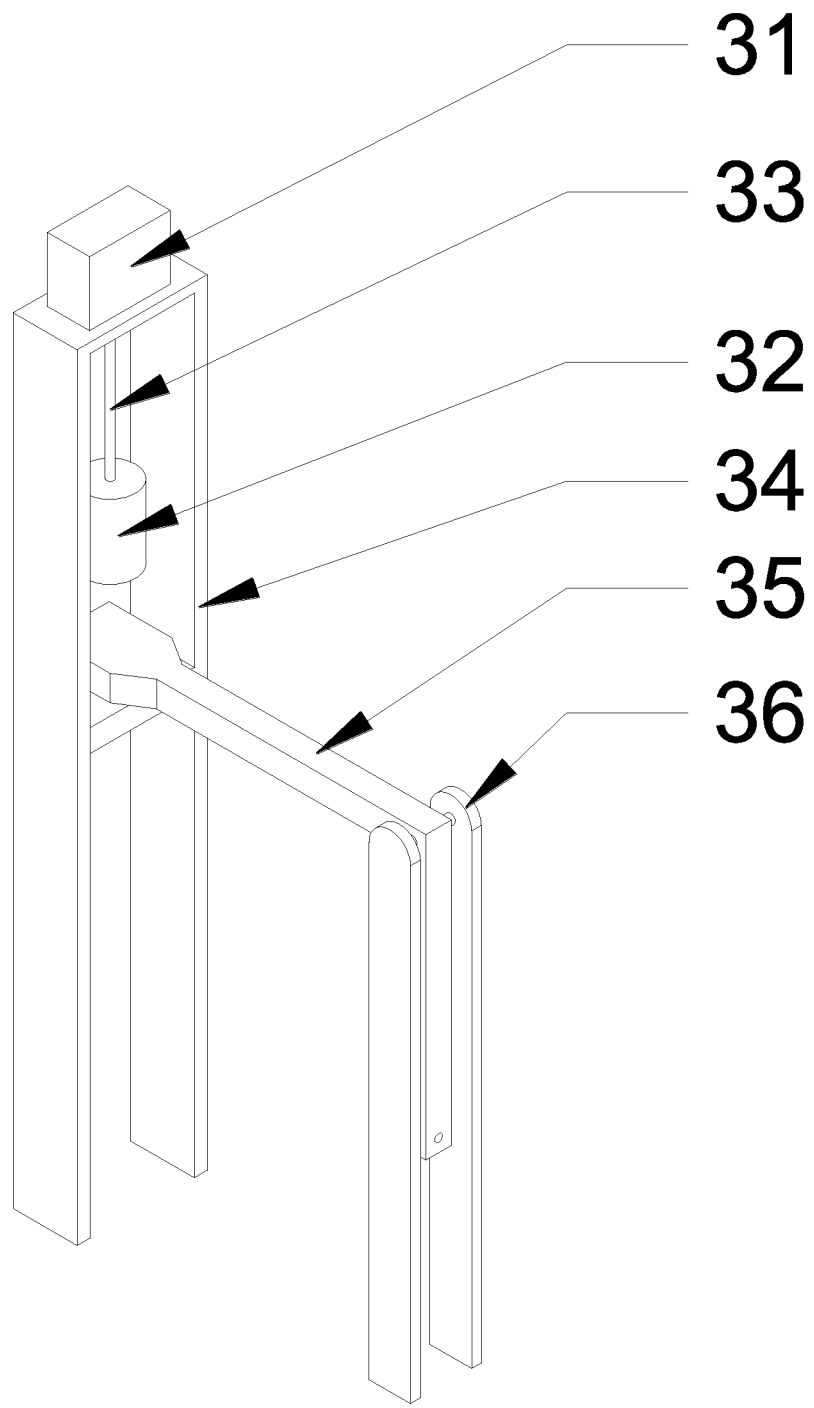
FIG. 18 is an isometric view of an impact apparatus according to an embodiment of the present disclosure.

Alternatively, an isometric view of the impact apparatus 3 is shown in FIG. 18.

Figure 19:
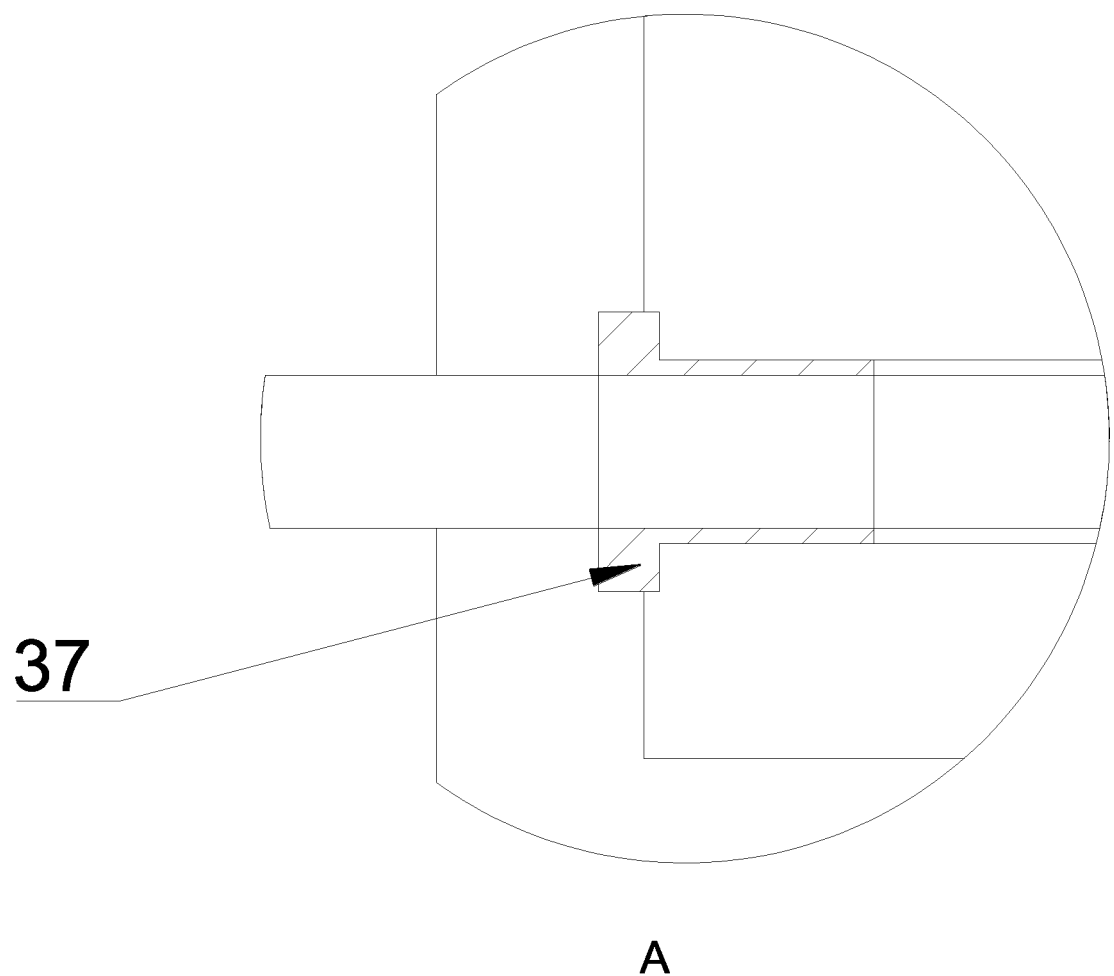
FIG. 19 is a schematic diagram of connection via a rubber sleeve according to an embodiment of the present disclosure.

The impact apparatus 3 includes: a motor 31, a weight 32, a second rope 33, a support frame 34, a linkage mechanism 35, and a fixed frame 36. It should be noted that point A in FIG. 14 may be connected by a rubber sleeve 37 in the impact apparatus 3, as shown in FIG. 19.

Specifically, the motor 31 may receive an input signal to adjust the length of the second rope 33, so that the weight 32 can be at a set height (to be measured). The upper end of the support frame 34 supports the motor 31, and the middle part is used for limiting the displacement of the linkage mechanism 35 after being hit by the weight 32. The cross rod and longitudinal rod of the linkage mechanism 35 have the same length. The rubber sleeve 37 keeps the second rope 33 and the linkage mechanism 35 fit through interference fit.

The second rope 33 is adjusted through the motor 31 of the impact apparatus 3 to determine the height of the weight 32. When the motor 31 does not pulls the second rope 33 anymore, the weight 32 directly falls, and the impact force of the weight 32 is transmitted to the first rope 25 below through the linkage mechanism 35, so that an impact effect is achieved.

The embodiment has the following technical effects: the test platform, the safety belt restraint apparatus, and the impact apparatus simulate the force generated by the safety belt on the chest of the dummy during impact, so that a problem that force deformation characteristics of the chest of the dummy cannot be accurately determined is solved, and whether the mechanical response of the chest of the dummy under safety belt load conforms to the force deformation characteristics of the human chest is explored, so as to evaluate the chest of the dummy.

It should be noted that the terms used in the present disclosure are only used for describing specific embodiments, rather than limiting the scope of the present application. As shown in the description and claims of the present disclosure, unless the context clearly dictates otherwise, the words "a", "an", "an" and/or "the" are not intended to specifically refer to the singular and can include the plural. The terms "include", "comprise", or any variants thereof are intended to cover a non-exclusive inclusion, so that a process, method, or device that includes a series of elements not only includes these elements, but also includes other elements not listed explicitly, or includes inherent elements of the process, method, or device. In the absence of more limitations, an element defined by "include a . . . " does not exclude other same elements existing in the process, method, or device including the element.

It should also be noted that the orientation or position relationships indicated by the terms "center", "upper", "lower", "left", "right", "vertical", "horizontal", "inner", "outer", etc. are based on the orientation or position relationships shown in the accompanying drawings and are intended to facilitate the description of the present disclosure and simplify the description only, rather than indicating or implying that the device or element referred to must have a particular orientation or be constructed and operated in a particular orientation, and cannot be interpreted as limiting the present disclosure. Unless otherwise specified and defined, the terms "mounted", "coupled" and "connected" should be generally understood, for example, the "connected" may be fixedly connected, detachably connected, integrally connected, mechanically connected, electrically connected, directly connected, or connected by a medium, or internal communication between two elements. For those of ordinary skill in the art, the specific meanings of the terms described above in the present disclosure can be construed according to specific circumstances.

Finally, it should be noted that the above embodiments are merely used to describe the technical solutions of the present disclosure, instead of limiting the same. Although the present disclosure has been described in detail with reference to all the foregoing embodiments, those of ordinary skill in the art should understand that the technical solutions described in all the foregoing embodiments can still be modified, and alternatively, some or all the technical features therein can be equivalently replaced. However, these modifications or substitutions do not make the essence of the corresponding technical solutions deviate from the technical solutions of all the embodiments of the present disclosure.

What is claimed is:

1. A method for measuring a relationship between crash dummy chest compression and a safety belt load, comprising:

fixing a dummy in a preset posture on a fixed bed in a test platform via a safety belt in a safety belt restraint apparatus;

controlling a chest cover plate in the test platform to move so as to maintain a preset relative position between the chest cover plate and the dummy;

controlling an impact apparatus to pull the safety belt in each pulling force to be measured, and determining a target displacement value of each measuring point of a plurality of measuring points on the dummy relative to the chest cover plate and a target pulling force between the impact apparatus and the safety belt after a first preset duration; and determining a target pulling force-displacement curve corresponding to each measuring point of the plurality of measuring points according to each target displacement value and each target pulling force, wherein the test platform, the safety belt restraint apparatus and the impact apparatus constitute a system for measuring a relationship between the crash dummy chest compression and the safety belt load.

2. The method according to claim 1, wherein the controlling a chest cover plate in the test platform to move so as to maintain a preset relative position between the chest cover plate and the dummy comprises:

controlling the chest cover plate in the test platform to move in a first direction and/or a second direction, so that a center point of the chest cover plate coincides with a measuring point at a middle part of a sternum of the dummy; and controlling the chest cover plate to move in a third direction, so that a distance between the chest cover plate and the chest of the dummy reaches a preset distance.

3. The method according to claim 1, wherein after determining a target pulling force-displacement curve corresponding to each measuring point, the method further comprises:

determining a simulation effect of the chest of the dummy according to the target pulling force-displacement curve and a predetermined real pulling force-displacement curve.

4. The method according to claim 1, wherein the controlling an impact apparatus to pull the safety belt comprises:

determining a height to be measured according to the pulling force to be measured, an impact distance, and a mass of a weight in the impact apparatus, wherein the weight is connected to the safety belt through a pulling force sensor;

controlling the weight to move to the height to be measured by a motor in the impact apparatus; and dropping the weight by the motor after a second preset duration, so that the weight falls and pulls the safety belt.

5. The method according to claim 1, wherein the preset posture is to bend thighs of the dummy upwards, enable buttocks of the dummy to be in contact with a first side of a support block in the test platform, enable calves of the dummy to be in contact with a second side of the support block, and put hands of the dummy on the thighs; and the measuring point on the dummy comprises: at least one of a first measuring point at a middle part of a clavicle of the dummy, a second measuring point at an upper part of a sternum of the dummy, a third measuring point at a right side of a middle part of a fourth rib of the dummy, a fourth measuring point at the middle part of the sternum of the dummy, a fifth measuring point at a left side of the middle part of the fourth rib of the dummy, a sixth measuring point at a lower part of the sternum of the dummy, and a seventh measuring point on a right side of a middle part of a fifth rib of the dummy.

6. A system for measuring a relationship between crash dummy chest compression and a safety belt load, comprising: a test platform, a safety belt restraint apparatus, and an impact apparatus, wherein the test platform comprises a fixed bed and a chest cover plate, the fixed bed is configured for placing a dummy, the chest cover plate is configured for measuring a target displacement value through a displacement sensor mounted on the chest cover plate, one side of the displacement sensor is mounted on the chest cover plate, and another side of the displacement sensor is mounted at each measuring point of a plurality of measuring points on the dummy;

the safety belt restraint apparatus comprises a safety belt and a pulling force sensor, the safety belt is configured for fixing the dummy on the fixed bed, and the pulling force sensor is connected to the impact apparatus and the safety belt so as to measure a target pulling force generated by the impact apparatus; and the impact apparatus is configured for pulling the safety belt to impact a chest of the dummy by the safety belt.

7. The system according to claim 6, wherein the test platform further comprises a support block, a first beam, and a second beam;

the support block is configured for supporting the dummy in a preset posture;

the first beam is configured for providing a moving track for the chest cover plate to move in a first direction; and the second beam is configured for providing a moving track for the chest cover plate to move in a second direction.

8. The system according to claim 6, wherein the safety belt restraint apparatus further comprises at least three pulley blocks, a balancing weight, and a first rope;

the first rope is configured for connecting the safety belt and the balancing weight through the at least three pulley blocks; and the balancing weight is configured for tensioning the safety belt through the first rope so as to fix the dummy.

9. The system according to claim 6, wherein the impact apparatus comprises: a motor, a weight, and a second rope;

the second rope is configured for connecting the motor and the weight;

the motor is configured for controlling movement of the weight through the second rope; and the weight is configured for pulling the safety belt through a force generated by falling, so that the safety belt impacts the chest of the dummy.

10. The system according to claim 9, wherein the impact apparatus further comprises: a support frame, a linkage mechanism, and a fixed frame corresponding to the linkage mechanism;

the support frame is configured for placing the motor and limiting movement of the linkage mechanism;

the linkage mechanism is configured for transmitting the force generated by falling of the weight to the second rope in the safety belt restraint apparatus so as to pull the safety belt through the second rope, so that the safety belt impacts the chest of the dummy; and the fixed frame is configured for fixing the linkage mechanism to a preset position.

* * * * *